United States Patent
Gan et al.

(10) Patent No.: US 12,223,629 B2
(45) Date of Patent: Feb. 11, 2025

(54) SYSTEMS AND METHODS FOR SMOKE-REDUCTION IN IMAGES

(71) Applicant: Covidien LP, Mansfield, MA (US)

(72) Inventors: Xiaofang Gan, Shanghai (CN); Zhenhai Zhang, Shanghai (CN); Zhentao Lu, Shanghai (CN)

(73) Assignee: Covidien LP, Mansfield, MA (US)

( * ) Notice: Subject to any disclaimer, the term of this patent is extended or adjusted under 35 U.S.C. 154(b) by 404 days.

(21) Appl. No.: 17/641,452

(22) PCT Filed: Sep. 11, 2019

(86) PCT No.: PCT/CN2019/105311
§ 371 (c)(1),
(2) Date: Mar. 9, 2022

(87) PCT Pub. No.: WO2021/046743
PCT Pub. Date: Mar. 18, 2021

(65) Prior Publication Data
US 2022/0392022 A1 Dec. 8, 2022

(51) Int. Cl.
*G06T 5/73* (2024.01)
*G06T 7/90* (2017.01)

(52) U.S. Cl.
CPC .................. *G06T 5/73* (2024.01); *G06T 7/90* (2017.01); *G06T 2207/10024* (2013.01); *G06T 2207/10068* (2013.01)

(58) Field of Classification Search
None
See application file for complete search history.

(56) References Cited

U.S. PATENT DOCUMENTS 6,132,368 A 10/2000 Cooper
6,206,903 B1 3/2001 Ramans
(Continued)

FOREIGN PATENT DOCUMENTS

CN 102982513 A 3/2013
CN 104392417 A 3/2015
(Continued)

OTHER PUBLICATIONS

Extended European Search Report for application No. 19945282.2 dated May 9, 2023.
(Continued)

*Primary Examiner* — Leon Flores
(74) *Attorney, Agent, or Firm* — Carter, DeLuca & Farrell LLP

(57) ABSTRACT

A method for smoke reduction in images includes accessing an RGB image of an object obscured by smoke, determining a dark channel matrix of the RGB image, estimating an atmospheric light matrix for the RGB image based on the dark channel, determining a transmission map based on to the atmospheric light matrix and the dark channel matrix, de-hazing the RGB image based on the transmission map to reduce the smoke in the RGB image, and displaying the de-hazed RGB image on a display device. The RGB image includes a plurality of pixels. The dark channel matrix includes, for each pixel of the plurality of pixels, a minimum color component intensity for a respective pixel area centered at the respective pixel. The atmospheric light matrix includes an atmospheric light component value for each of the plurality of pixels.

12 Claims, 6 Drawing Sheets

(56) References Cited

U.S. PATENT DOCUMENTS

| | | |
|---|---|---|
| 6,246,200 B1 | 6/2001 | Blumenkranz et al. |
| 6,312,435 B1 | 11/2001 | Wallace et al. |
| 6,331,181 B1 | 12/2001 | Tierney et al. |
| 6,394,998 B1 | 5/2002 | Wallace et al. |
| 6,424,885 B1 | 7/2002 | Niemeyer et al. |
| 6,441,577 B2 | 8/2002 | Blumenkranz et al. |
| 6,459,926 B1 | 10/2002 | Nowlin et al. |
| 6,491,691 B1 | 12/2002 | Morley et al. |
| 6,491,701 B2 | 12/2002 | Tierney et al. |
| 6,493,608 B1 | 12/2002 | Niemeyer |
| 6,565,554 B1 | 5/2003 | Niemeyer |
| 6,645,196 B1 | 11/2003 | Nixon et al. |
| 6,659,939 B2 | 12/2003 | Moll |
| 6,671,581 B2 | 12/2003 | Niemeyer et al. |
| 6,676,684 B1 | 1/2004 | Morley et al. |
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban, III et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban, III et al. |
| 8,206,406 B2 | 6/2012 | Orban, III |
| 8,210,413 B2 | 7/2012 | Whitman et al. |
| 8,216,250 B2 | 7/2012 | Orban, III et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,608,773 B2 | 12/2013 | Tierney et al. |
| 8,620,473 B2 | 12/2013 | Diolaiti et al. |
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |

(56) References Cited

U.S. PATENT DOCUMENTS

| | | |
|---|---|---|
| 8,838,270 B2 | 9/2014 | Druke et al. |
| 8,852,174 B2 | 10/2014 | Burbank |
| 8,858,547 B2 | 10/2014 | Brogna |
| 8,862,268 B2 | 10/2014 | Robinson et al. |
| 8,864,751 B2 | 10/2014 | Prisco et al. |
| 8,864,752 B2 | 10/2014 | Piolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,989,903 B2 | 3/2015 | Weir et al. |
| 9,002,518 B2 | 4/2015 | Manzo |
| 9,014,856 B2 | 4/2015 | Manzo et al. |
| 9,016,540 B2 | 4/2015 | Whitman et al. |
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs, II et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 | 9/2016 | Burns et al. |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,575,909 B2 | 3/2020 | Robinson et al. |
| 10,592,529 B2 | 3/2020 | Hoffman et al. |
| 10,595,946 B2 | 3/2020 | Nixon |
| 10,881,469 B2 | 1/2021 | Robinson |
| 10,881,473 B2 | 1/2021 | Itkowitz et al. |
| 10,898,188 B2 | 1/2021 | Burbank |
| 10,898,189 B2 | 1/2021 | McDonald, II |
| 10,905,506 B2 | 2/2021 | Itkowitz et al. |
| 10,912,544 B2 | 2/2021 | Brisson et al. |
| 10,912,619 B2 | 2/2021 | Jarc et al. |
| 10,918,387 B2 | 2/2021 | Duque et al. |
| 10,918,449 B2 | 2/2021 | Solomon et al. |
| 10,932,873 B2 | 3/2021 | Griffiths et al. |
| 10,932,877 B2 | 3/2021 | Devengenzo et al. |
| 10,939,969 B2 | 3/2021 | Swarup et al. |
| 10,939,973 B2 | 3/2021 | DiMaio et al. |
| 10,952,801 B2 | 3/2021 | Miller et al. |
| 10,965,933 B2 | 3/2021 | Jarc |
| 10,966,742 B2 | 4/2021 | Rosa et al. |
| 10,973,517 B2 | 4/2021 | Wixey |
| 10,973,519 B2 | 4/2021 | Weir et al. |
| 10,984,567 B2 | 4/2021 | Itkowitz et al. |
| 10,993,773 B2 | 5/2021 | Cooper et al. |
| 10,993,775 B2 | 5/2021 | Cooper et al. |

(56) References Cited

U.S. PATENT DOCUMENTS

| | | |
|---|---|---|
| 11,000,331 B2 | 5/2021 | Krom et al. |
| 11,013,567 B2 | 5/2021 | Wu et al. |
| 11,020,138 B2 | 6/2021 | Ragosta |
| 11,020,191 B2 | 6/2021 | Diolaiti et al. |
| 11,020,193 B2 | 6/2021 | Wixey et al. |
| 11,026,755 B2 | 6/2021 | Weir et al. |
| 11,026,759 B2 | 6/2021 | Donlon et al. |
| 11,040,189 B2 | 6/2021 | Vaders et al. |
| 11,045,077 B2 | 6/2021 | Stern et al. |
| 11,045,274 B2 | 6/2021 | Dachs, II et al. |
| 11,058,501 B2 | 7/2021 | Tokarchuk et al. |
| 11,076,925 B2 | 8/2021 | DiMaio et al. |
| 11,090,119 B2 | 8/2021 | Burbank |
| 11,096,687 B2 | 8/2021 | Flanagan et al. |
| 11,098,803 B2 | 8/2021 | Duque et al. |
| 11,109,925 B2 | 9/2021 | Cooper et al. |
| 11,116,578 B2 | 9/2021 | Hoffman et al. |
| 11,129,683 B2 | 9/2021 | Steger et al. |
| 11,135,029 B2 | 10/2021 | Suresh et al. |
| 11,147,552 B2 | 10/2021 | Burbank et al. |
| 11,147,640 B2 | 10/2021 | Jarc et al. |
| 11,154,373 B2 | 10/2021 | Abbott et al. |
| 11,154,374 B2 | 10/2021 | Hanuschik et al. |
| 11,160,622 B2 | 11/2021 | Goldberg et al. |
| 11,160,625 B2 | 11/2021 | Wixey et al. |
| 11,161,243 B2 | 11/2021 | Rabindran et al. |
| 11,166,758 B2 | 11/2021 | Mohr et al. |
| 11,166,770 B2 | 11/2021 | DiMaio et al. |
| 11,166,773 B2 | 11/2021 | Ragosta et al. |
| 11,173,597 B2 | 11/2021 | Rabindran et al. |
| 11,185,378 B2 | 11/2021 | Weir et al. |
| 11,191,596 B2 | 12/2021 | Thompson et al. |
| 11,197,729 B2 | 12/2021 | Thompson et al. |
| 11,213,360 B2 | 1/2022 | Hourtash et al. |
| 11,221,863 B2 | 1/2022 | Azizian et al. |
| 11,234,700 B2 | 2/2022 | Ragosta et al. |
| 11,241,274 B2 | 2/2022 | Vaders et al. |
| 11,241,290 B2 | 2/2022 | Waterbury et al. |
| 11,259,870 B2 | 3/2022 | DiMaio et al. |
| 11,259,884 B2 | 3/2022 | Burbank |
| 11,272,993 B2 | 3/2022 | Gomez et al. |
| 11,272,994 B2 | 3/2022 | Saraliev et al. |
| 11,291,442 B2 | 4/2022 | Wixey et al. |
| 11,291,513 B2 | 4/2022 | Manzo et al. |
| 2011/0188775 A1* | 8/2011 | Sun .................. G06T 5/50 382/274 |
| 2018/0308225 A1 | 10/2018 | Shah et al. |
| 2020/0250797 A1* | 8/2020 | Park .................. G06T 5/75 |

FOREIGN PATENT DOCUMENTS

| | | |
|---|---|---|
| CN | 106023092 A | 10/2016 |
| CN | 106 846 259 A | 6/2017 |
| CN | 109754372 A | 5/2019 |

OTHER PUBLICATIONS

Kaiming He et al: "Single Image Haze Removal Using Dark Channel Prior", IEEE Transactions on Pattern Analysis and Machine Intelligence, IEEE Computer Society, USA, vol. 33, No. 12, Dec. 1, 2011, pp. 2341-2353.

Tchaka et al: "Chromaticity based smoke removal in endoscopic images", Proceedings of SPIE, vol. 10133, Feb. 24, 2017, p. 101331M.

International Search Report mailed May 29, 2020 and Written Opinion completed May 19, 2020 corresponding to counterpart Int'l Patent Application PCT/CN2019/105311.

* cited by examiner

SYSTEMS AND METHODS FOR SMOKE-REDUCTION IN IMAGES

CROSS-REFERENCE TO RELATED APPLICATIONS

The present application is a U.S. National Stage Application filed under 35 U.S.C. § 371(a) claiming the benefit of and priority to International Patent Application No. PCT/CN2019/105311, filed Sep. 11, 2019, the entire disclosure of which being incorporated by reference herein.

FIELD

The present disclosure relates to devices, systems and methods for smoke-reduction in images, and more particularly, to smoke-reduction in images during surgical procedures.

BACKGROUND

Endoscopes are introduced through an incision or a natural body orifice to observe internal features of a body. Conventional endoscopes are used for visualization during endoscopic or laparoscopic surgical procedures. During such surgical procedures, it is possible for smoke to be generated when the energy surgical instrument is used, for example, to cut tissue with electrosurgical energy during the surgery. Thus, the image acquired by the endoscope may become blurry because of this smoke. The smoke may obscure features of the surgical site and delay the surgical procedure while surgeons wait for the smoke to clear. Other procedures may experience similar issues where smoke is present during the capture of an image. Accordingly, there is interest in improving imaging technology.

SUMMARY

The present disclosure relates to devices, systems, and methods for smoke reduction in images. In accordance with aspects of the present disclosure, a method for smoke reduction in images includes accessing an RGB image of an object obscured by smoke, determining a dark channel matrix of the RGB image, estimating an atmospheric light matrix for the RGB image based on the dark channel, determining a transmission map based on the atmospheric light matrix and the dark channel matrix, de-hazing the RGB image based on the transmission map to reduce the smoke in the RGB image, and displaying the de-hazed RGB image on a display device. The RGB image includes a plurality of pixels. The dark channel matrix includes, for each pixel of the plurality of pixels, a minimum color component intensity for a respective pixel area centered at the respective pixel. The atmospheric light matrix includes an atmospheric light component value for each of the plurality of pixels.

In an aspect of the present disclosure, the de-hazing the RGB image includes converting the RGB image to a YUV image, performing a de-hazing operation on the YUV image to provide a Y'UV image, and converting the Y'UV image to the de-hazed RGB image.

In an aspect of the present disclosure, the performing the de-hazing operation on the YUV image includes, for each pixel x of the plurality of pixels, determining Y' as $$Y'(x) = \frac{Y(x) - A(x)}{T(x)}.$$

$T(x)$ is a transmission component for the pixel x. $A(x)$ is the atmospheric light component value for the pixel x.

In another aspect of the present disclosure, the performing the de-hazing operation on the YUV image further includes replacing a Y channel of the YUV image with the determined Y' to provide a Y'UV image.

In an aspect of the present disclosure, the estimating the atmospheric light matrix includes, for each pixel x of the plurality of pixels: determining an atmospheric light component value for the pixel x as: $A(x) = \max(\min(I^c(y)))*\text{coef}$, for all $y \in \Omega(x)$, where $\Omega(x)$ is a pixel area centered at pixel x, y is a pixel of the pixel area $\Omega(x)$, $I^c(y)$ is an intensity value of a color component c of the pixel y, and coef is a predetermined coefficient value.

In an aspect of the present disclosure, the determining the transmission map includes determining, for each pixel x of the plurality of pixels, a transmission component as:

$$T(x) = 1 - \omega * \frac{I\_DARK(X)}{A(X)}.$$

Where $\omega$ is a predetermined constant, $I\_DARK(x)$ is the dark channel matrix value for the pixel x, and $A(x)$ is the atmospheric light component value for the pixel x.

In accordance with aspects of the present disclosure, a method for smoke reduction in images is presented. The method includes accessing an image obscured by smoke, for each pixel of the plurality of pixels: (i) determining a dark channel matrix value for the respective pixel as a minimum color component intensity value for a respective pixel area centered at the respective pixel, and (ii) estimating an atmospheric light component value for the pixel x based on the minimum color component intensity value for each pixel of the pixel area, de-hazing the image based on the atmospheric light component values for the plurality of pixels, and displaying the de-hazed image on a display device. The image includes a plurality of pixels, where each pixel of the image includes a plurality of color components.

In a further aspect of the present disclosure, the de-hazing the image includes determining a transmission map value for each pixel x of the plurality of pixels as:

$$T(x) = 1 - \omega * \frac{I\_DARK(X)}{A(X)},$$

converting the image to a YUV image, determining Y' for each pixel x of the plurality of pixels as $$Y'(x) = \frac{Y(x) - A(x)}{T(x)},$$

and replacing a Y channel of the YUV image with the determined Y' to provide a Y'UV image, where $\omega$ is a predetermined constant, $I\_DARK(x)$ is the dark channel matrix value for the pixel x, and $A(x)$ is the atmospheric light component value for the pixel x.

In an aspect of the present disclosure, the de-hazing the image further includes converting the Y'UV image to a de-hazed image.

In yet another aspect of the present disclosure, the image includes at least one of an RGB image, a CMYK image, a CIELAB image, or a CIEXYZ image.

In an aspect of the present disclosure, the estimating the atmospheric light matrix includes, for each pixel x of the plurality of pixels: determining an atmospheric light component value for the pixel x as A(x)=max(min(I$^c$(y)))*coef, for all y∈Ω(x), where Ω(x) is a pixel area centered at pixel x, y is a pixel of the pixel area Ω(x), I$^c$(y) is an intensity value of a color component c of the pixel y, and coef is a predetermined coefficient value.

In accordance with aspects of the present disclosure, a system for smoke reduction in images is presented. The system may include a light source configured to provide light, an imaging device configured to acquire images, an imagining device control unit configured to control the imaging device. The image includes a plurality of pixels, where each pixel of the image may include a plurality of color components. The control unit may include a processor and a memory storing instructions. The instructions which, when executed by the processor, causes the system to access the image, for each of the pixels: determine a dark channel matrix value for the respective pixel as a minimum color component intensity value for a respective pixel area centered at the respective pixel, and estimate an atmospheric light component value for each pixel based on the minimum color component intensity value for each pixel of the pixel area, de-haze the image based on the atmospheric light component value for each of the pixels, and display the de-hazed image on a display device.

In a further aspect of the present disclosure, the instructions when de-hazing the image, may further cause the system to determine a transmission map value for each pixel x of the plurality of pixels as $$T(x) = 1 - \omega * \frac{I\_DARK(X)}{A(X)},$$

convert the image to a YUV image, determine Y' as $$Y'(x) = \frac{Y(x) - A(x)}{T(x)},$$

and replace a Y channel of the YUV image with the determined Y' to provide a Y'UV image, where ω is a predetermined constant, I_DARK(x) is the dark channel matrix value for the pixel x, and A(x) is the atmospheric light component value for the pixel x.

In yet a further aspect of the present disclosure, the instructions when de-hazing the image may further cause the system to convert the Y'UV image to a de-hazed image.

In yet another aspect of the present disclosure, the image includes at least one of an RGB image, a CMYK image, a CIELAB image, or a CIEXYZ image.

In an aspect of the present disclosure, the estimating the atmospheric light matrix includes determining an atmospheric light component value for the pixel x as A(x)=max (min(I$^c$(y)))*coef, for all y∈Ω(x). Where y is a pixel, I$^c$(y) is an intensity value of a color component c of the pixel y, and coef is a predetermined coefficient value.

Further details and aspects of various embodiments of the present disclosure are described in more detail below with reference to the appended figures.

BRIEF DESCRIPTION OF THE DRAWINGS

Embodiments of the present disclosure are described herein with reference to the accompanying drawings, wherein.

Figure 1:
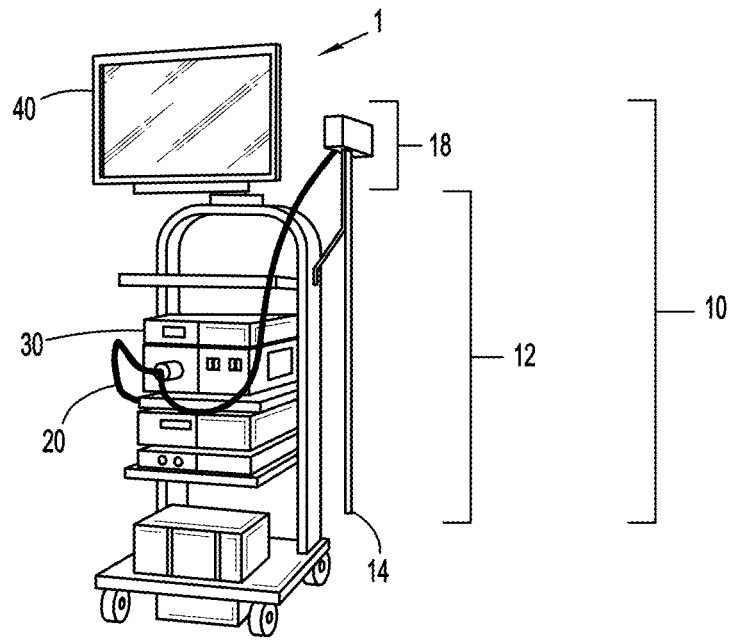
FIG. 1 is a diagram of an exemplary visualization or endoscope system in accordance with the present disclosure.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION OF EMBODIMENTS

Embodiments of the presently disclosed devices, systems, and methods of treatment are described in detail with reference to the drawings, in which like reference numerals designate identical or corresponding elements in each of the several views. As used herein, the term "distal" refers to that portion of a structure that is farther from a user, while the term "proximal" refers to that portion of a structure that is closer to the user. The term "clinician" refers to a doctor, nurse, or other care provider and may include support personnel.

The present disclosure is applicable where images of a surgical site are captured. Endoscope systems are provided as an example, but it will be understood that such description is exemplary and does not limit the scope and applicability of the present disclosure to other systems and procedures.

Figure 2:
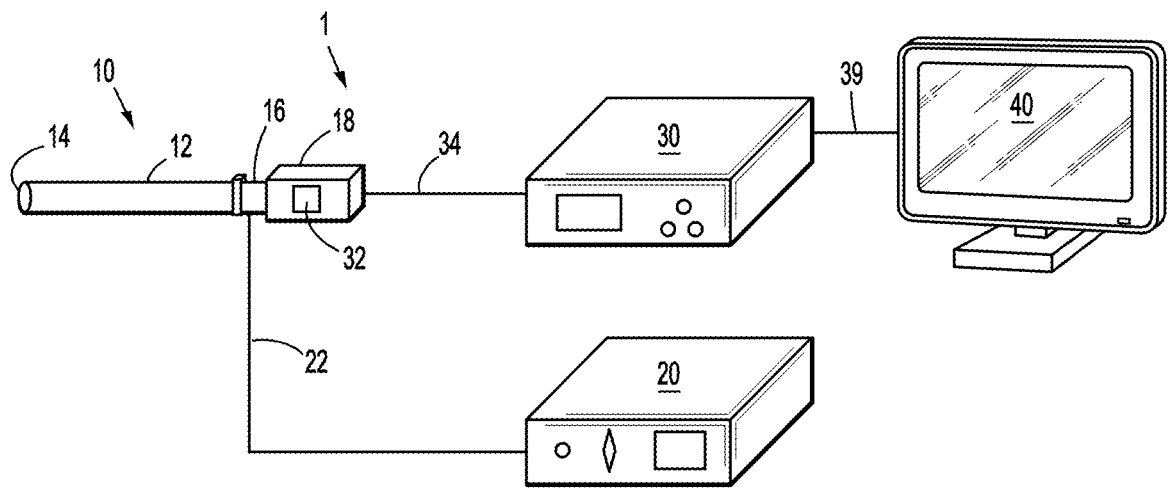
FIG. 2 is a schematic configuration of the visualization or endoscope system of FIG. 1.
Figure 3:
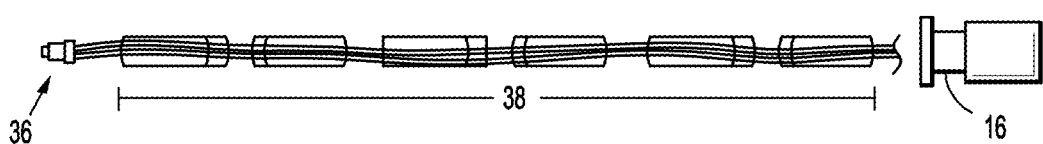
FIG. 3 is a diagram illustrating another schematic configuration of an optical system of the system of FIG. 1.

Referring initially to FIGS. 1-3, an endoscope system 1, in accordance with the present disclosure, includes an endoscope 10, a light source 20, a video system 30, and a display device 40. With continued reference to FIG. 1, the light source 20, such as an LED/Xenon light source, is connected to the endoscope 10 via a fiber guide 22 that is operatively coupled to the light source 20 and to an endocoupler 16 disposed on, or adjacent to, a handle 18 of the endoscope 10. The fiber guide 22 includes, for example, fiber optic cable which extends through the elongated body 12 of the endoscope 10 and terminates at a distal end 14 of the endoscope 10. Accordingly, light is transmitted from the light source 20, through the fiber guide 22, and emitted out the distal end 14 of the endoscope 10 toward a targeted internal feature, such as tissue or an organ, of a body of a patient. As the light transmission pathway in such a configuration is relatively long, for example, the fiber guide 22 may be about 1.0 m to about 1.5 m in length, only about 15% (or less) of the light flux emitted from the light source 20 is outputted from the distal end 14 of the endoscope 10.

With reference to FIG. 2 and FIG. 3, the video system 30 is operatively connected to an image sensor 32 mounted to, or disposed within, the handle 18 of the endoscope 10 via a data cable 34. An objective lens 36 is disposed at the distal end 14 of the elongated body 12 of the endoscope 10 and a series of spaced-apart, relay lenses 38, such as rod lenses, are positioned along the length of the elongated body 12 between the objective lens 36 and the image sensor 32. Images captured by the objective lens 36 are forwarded through the elongated body 12 of the endoscope 10 via the relay lenses 38 to the image sensor 32, which are then communicated to the video system 30 for processing and output to the display device 40 via cable 39. The image sensor 32 is located within, or mounted to, the handle 18 of the endoscope 10, which can be up to about 30 cm away from the distal end 14 of the endoscope 10.

With reference to FIGS. 4-7, the flow diagrams include various blocks described in an ordered sequence. However, those skilled in the art will appreciate that one or more blocks of the flow diagram may be performed in a different order, repeated, and/or omitted without departing from the scope of the present disclosure. The below description of the flow diagram refers to various actions or tasks performed by one or more video system 30, but those skilled in the art will appreciate that the video system 30 is exemplary. In various embodiments, the disclosed operations can be performed by another component, device, or system. In various embodiments, the video system 30 or other component/device performs the actions or tasks via one or more software applications executing on a processor. In various embodiments, at least some of the operations can be implemented by firmware, programmable logic devices, and/or hardware circuitry. Other implementations are contemplated to be within the scope of the present disclosure.

Figure 4:
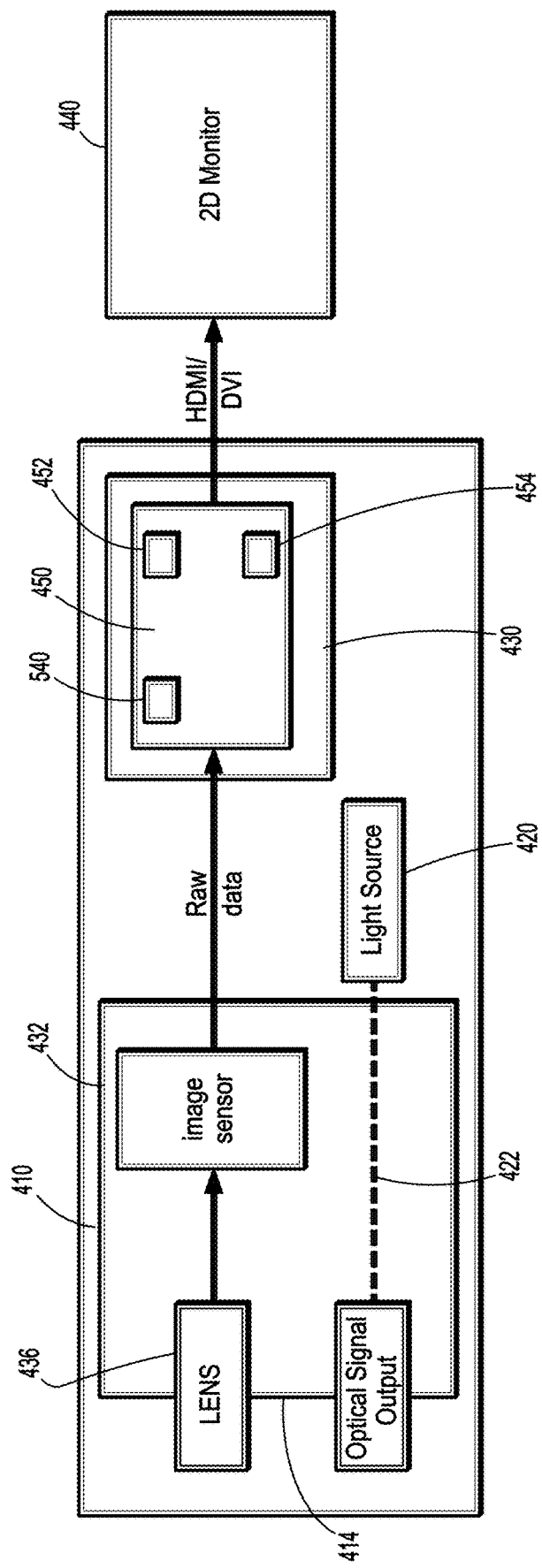
FIG. 4 is a schematic configuration of the visualization or endoscope system in accordance with an embodiment of the present disclosure.

Referring to FIG. 4, there is shown a schematic configuration of a system, which may be the endoscope system of FIG. 1 or may be a different type of system (e.g., visualization system, etc.). The system, in accordance with the present disclosure, includes an imaging device 410, a light source 420, a video system 430, and a display device 440. The light source 420 is configured to provide light to a surgical site through the imaging device 410 via the fiber guide 422. The distal end 414 of the imaging device 410 includes an objective lens 436 for capturing the image at the surgical site. The objective lens 436 forwards the image to the image sensor 432. The image is then communicated to the video system 430 for processing. The video system 430 includes an imaging device controller 450 for controlling the endoscope and processing the images. The imaging device controller 450 includes processor 452 connected to a computer-readable storage medium or a memory 454 which may be a volatile type memory, such as RAM, or a non-volatile type memory, such as flash media, disk media, or other types of memory. In various embodiments, the processor 452 may be another type of processor such as, without limitation, a digital signal processor, a microprocessor, an ASIC, a graphics processing unit (GPU), field-programmable gate array (FPGA), or a central processing unit (CPU).

In various embodiments, the memory 454 can be random access memory, read only memory, magnetic disk memory, solid state memory, optical disc memory, and/or another type of memory. In various embodiments, the memory 454 can be separate from the imaging device controller 450 and can communicate with the processor 452 through communication buses of a circuit board and/or through communication cables such as serial ATA cables or other types of cables. The memory 454 includes computer-readable instructions that are executable by the processor 452 to operate the imaging device controller 450. In various embodiments, the imaging device controller 450 may include a network interface 540 to communicate with other computers or a server.

Figure 5:
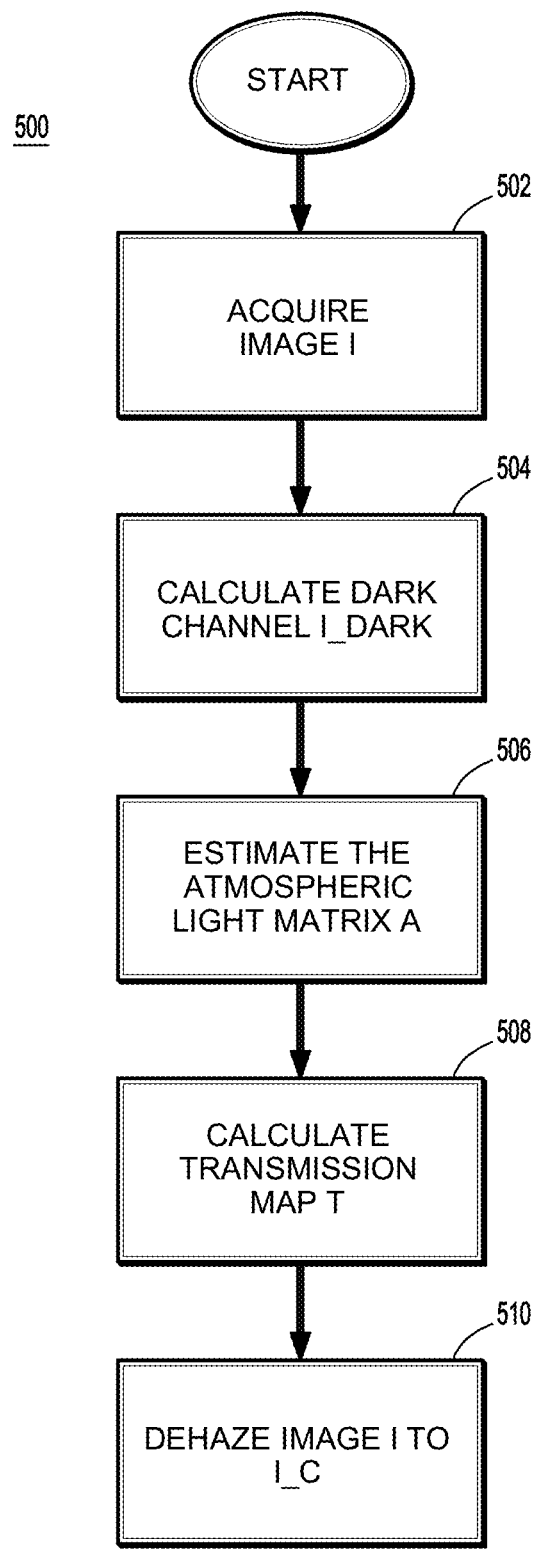
FIG. 5 is a flowchart of a method for smoke reduction in accordance with an exemplary embodiment of the disclosure.

Referring now to FIG. 5, there is shown an operation for smoke reduction in images. In various embodiments, the operation of FIG. 5 can be performed by an endoscope system 1 described above herein. In various embodiments, the operation of FIG. 5 can be performed by another type of system and/or during another type of procedure. The following description will refer to an endoscope system, but it will be understood that such description is exemplary and does not limit the scope and applicability of the present disclosure to other systems and procedures. The following description will refer to an RGB (Red, Green, Blue) image or RGB color model, but it will be understood that such description is exemplary and does not limit the scope and applicability of the present disclosure to other types of images or color models (for example, CMYK (Cyan, Magenta, Yellow, Key), CIELAB, or CIEXYZ). The image sensor 32 may capture raw data. The format of the raw data may be RGGB, RGBG, GRGB, or BGGR. The video system 30 may convert the raw data to RGB using a demosaicing algorithm. A demosaicing algorithm is a digital image process used to reconstruct a full-color image from the incomplete color samples output from an image sensor overlaid with a color filter array (CFA). It is also known as CFA interpolation or color reconstruction. The RGB image may be further converted by the video system 30 to another color model, such as CMYK, CIELAB, or CIEXYZ.

Initially, at step 502, an image of a surgical site is captured via the objective lens 36 and forwarded to the image sensor 32 of endoscope system 1. The term "image" as used herein may include still images or moving images (for example, video). In various embodiments, the captured image is communicated to the video system 30 for processing. For example, during an endoscopic procedure, a surgeon may cut tissue with an electrosurgical instrument. During this cutting, smoke may be generated. When the image is captured, it may include the smoke. Smoke is generally a turbid medium (such as particles, water droplets) in the atmosphere. The irradiance received by the objective lens 36 from the scene point is attenuated by the line of sight. This incoming light is mixed with ambient light (air-light) reflected into the line of sight by atmospheric particles such as smoke. This smoke degrades the image, making it lose contrast and color fidelity.

Figure 6:
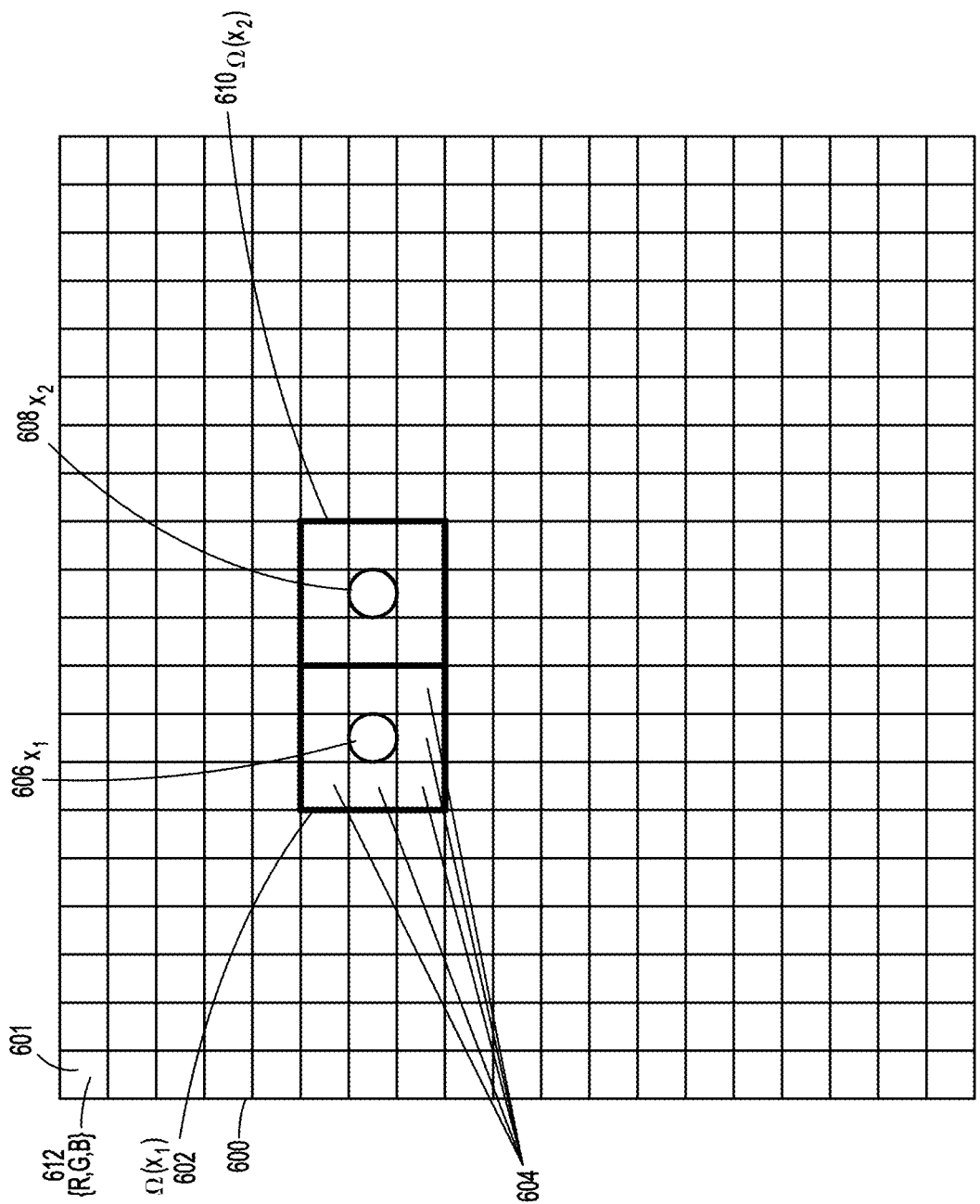
FIG. 6 is an exemplary input image including an area of pixels in accordance with the present disclosure.

FIG. 6 shows an exemplary pixel representation of an image captured in step 502. In various embodiments, the captured image may or may not have been processed during the capture process or after the capture process. In various embodiments, an image 600 includes a number of pixels, and the dimensions of the image 600 are often represented as the amount of pixels in an X by Y format, such as 500×500 pixels, for example. In accordance with aspects of the present disclosure, and as explained in more detail later herein, each pixel of the image 600 may be processed based on a pixel area 602, 610 centered at that pixel, which will also be referred to herein as a patch. In various embodiments, each patch/pixel area of the image can have the same size. In various embodiments, different pixel areas or patches can have different sizes. Each pixel area or patch can be denoted as $\Omega(x)$, which is a pixel area/patch having a particular pixel x as its center pixel. In the illustrative example of FIG. 6, the pixel area 602 has a size of 3×3 pixels and is centered at a particular pixel $x_1$ 606. If an image has 18 by 18 pixels, a patch size may be 3×3 pixels. The illustrated image size and patch size are exemplary and other image sizes and patch sizes are contemplated to be within the scope of the present disclosure.

With continuing reference to FIG. 6, each pixel 601 in an image 600 may have combinations of color components 612, such as red, green, and blue, which are also referred to herein as color channels. $I^c(y)$ is used herein to denote the intensity value of a color component c of a particular pixel y in the image 600. For a pixel 601, each of the color components 612 has an intensity value representing the brightness intensity of that color component. For example, for a 24 bit RGB image, each of the color components 612 has 8 bits, which corresponds to each color component having 256 possible intensity values.

Referring again to FIG. 5, at step 504, the video system 30 determines a dark channel matrix for the image 600. As used herein, the phrase "dark channel" of a pixel refers to the lowest color component intensity value among all pixels of a patch $\Omega(x)$ 602 centered at a particular pixel x. The term "dark channel matrix" of an image, as used herein, refers to a matrix of the dark channel of every pixel of the image. The dark channel of a pixel x will be denoted as I_DARK(x). In various embodiments, the video system 30 calculates the dark channel of a pixel as follows:

$$I\_DARK(x)=\min(\min(I^c(y))), \text{ for all } c\in\{r,g,b\} y\in\Omega(x)$$

where y denotes a pixel of the patch $\Omega(x)$, c denotes a color component, and $I^c(y)$ denotes the intensity value of the color component c of pixel y. Thus, the dark channel of a pixel x is the outcome of two minimum operations across two variables c and y, which together determine the lowest color component intensity value among all pixels of a patch centered at pixel x. In various embodiments, the video system 30 can calculate the dark channel of a pixel by acquiring the lowest color component intensity value for every pixel in the patch and then finding the minimum value among all those values. For cases where the center pixel of the patch is at or near the edge of the image, only the part of the patch in the image is used.

For example, with reference to FIG. 6, for an image 600 that was captured in step 502, the image 600 may have a height and width of 18×18 pixels, the pixel area (patch) size may be 3×3 pixels. For example, a 3×3 pixel area $\Omega(x_1)$ 602 centered at $x_1$ 606 may have the following intensities for the R, G, and B channels for each of the 9 pixels in the patch:

$$\begin{bmatrix} 1,3,6 & 2,0,1 & 5,3,4 \\ 2,4,3 & 6,7,4 & 7,6,9 \\ 1,3,2 & 5,8,9 & 9,11,25 \end{bmatrix}$$

In this example, for the top-left pixel in the pixel area $\Omega(x_1)$ 602, the R channel may have an intensity of 1, the G channel may have an intensity of 3, and the B channel may have an intensity of 6. Here, the R channel has the minimum intensity value (a value of 1) of the RGB channels for that pixel.

The minimum color component intensity value of each the pixels would be determined. For example, for the 3×3-pixel area $\Omega(x_1)$ 602 centered at $x_1$, the minimum color component intensity value for each of the pixels in the pixel area $\Omega(x_1)$ 602 are:

$$\begin{bmatrix} 1 & 0 & 3 \\ 2 & 4 & 6 \\ 1 & 5 & 9 \end{bmatrix}$$

Thus, the dark channel of the pixel would have an intensity value of 0 for this exemplary 3×3-pixel area $\Omega(x)$ 602 centered at $x_1$.

Referring again to FIG. 5, at step 506, the video system 30 estimates an atmospheric light component for each pixel, and the atmospheric light components for all of the pixels are together referred to herein as an "atmospheric light matrix." The estimated atmospheric light component for a pixel x will be denoted herein as A(x). In various embodiments, A(x) can be determined based on the lowest color component intensity value for each pixel y 604 in a pixel area $\Omega(x)$ 602, which can be denoted as:

$$A(x)=f(\min(I^c(y))), \text{ for all } c\in\{r,g,b\} y\in\Omega(x),$$

where f( ) is an operation for estimating the atmospheric light component, based on the lowest color component intensity value for each pixel y 604 in the patch $\Omega(x_1)$ 602. In various embodiments, the operation f( ) may determine the maximum value among $\min(I^c(y))$, for $y\in\Omega(x)$. In various embodiments, the maximum value can be scaled by a coefficient "coef," which in various embodiments can have a value between 0 and 1, such as 0.85. The embodiment of atmospheric light component described above may be provided as follows:

$$A(x)=f(\min(I^c(y)))=\max(\min(I^c(y)))*\text{coef}, \text{ for all } c\in\{r,g,b\} y\in\Omega(x)$$

For example, using the same example above for intensity values in patch $\Omega(x_1)$ 602, the video system 30 determines the atmospheric light component $A(x_1)$ to be 9*coef.

At step 508, the video system 30 determines what is referred to herein as a transmission map T. The transmission map T is determined based on the dark channel matrix and the atmospheric light matrix, which were determined in steps 504 and 506. The transmission map includes a transmission component T(x) for each pixel x. In various embodiments, the transmission component can be determined as follows:

$$T(x) = 1 - \omega * \frac{I\_DARK(X)}{A(X)},$$

where ω is a parameter having a value between 0 and 1, such as 0.85. In practice, even in clear images, there are some particles. Thus, some haze exists when distant objects are observed. The presence of haze is a cue to human perception of depth. If all haze is removed, the perception of depth may be lost. Therefore, to retain some haze, the parameter ω (0<ω<=1) is introduced. In various embodiments, the value of ω can vary based on the particular application. Thus, the transmission map is equal to 1 minus ω times the dark channel of a pixel (I-DARK(x)) divided by the atmospheric light component of the pixel, A(x).

Figure 7:
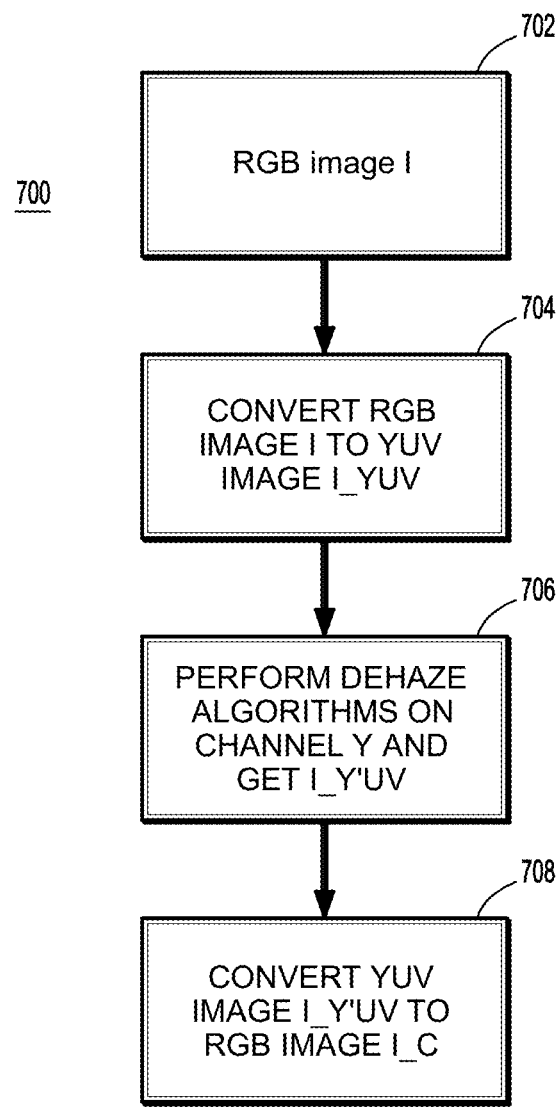
FIG. 7 is a flowchart of a method for performing de-hazing in accordance with the disclosure.

At step 510, the video system 30 de-hazes the image based on the transmission map. FIG. 7 illustrates one way to perform the de-hazing operation.

With reference to FIG. 7, the illustrated operation assumes that the original image is an RGB image. The operation attempts to retain the color of the original RGB image 600 as much as possible in the de-haze process. In various embodiments, the de-hazing operation converts the image 600 from the RGB color space to the YUV color space (Y is luminance, U and V are chrominance or color), and applies dehazing on the Y (luma) channel, which is generally a weighted sum of the RGB color channels.

Initially, at step 702 the video system 30 converts the RGB image 600 to a YUV image denoted as I-YUV. The conversion of each pixel from RGB and YUV may be performed as follows:

$$\begin{bmatrix} Y \\ U \\ V \end{bmatrix} = \begin{bmatrix} 0.2126 & 0.7152 & 0.0722 \\ -0.09991 & -0.33609 & 0.436 \\ 0.615 & -0.55861 & -0.05639 \end{bmatrix} \begin{bmatrix} R \\ G \\ B \end{bmatrix}$$

Next, at step 704 the video system 30 performs a dehazing operation on the channel Y (luma) of the I-YUV image. In accordance with aspects of the present disclosure, the de-hazing operation is as following:

$$Y'(x) = \frac{Y(x) - A(x)}{T(x)}$$

where Y'(x) is the Y(luma) channel of de-hazed image I-Y'UV. A(x) is the estimated atmospheric light component for pixel x, and T(x) is the transmission map value for pixel x. Thus, the Y(luma) channel of de-hazed image I-Y'UV is equal to the difference of the Y(luma) channel of image I-YUV and the estimated atmospheric light component A(x) calculated in step 506, divided by the transmission map value T(x) which was determined in step 508.

Finally, at step 706 the video system 30 converts the YUV image I-Y'UV to an de-hazed RGB image, the conversion from YUV to RGB is as follows:

$$\begin{bmatrix} R \\ G \\ B \end{bmatrix} = \begin{bmatrix} 1 & 0 & 1.28033 \\ 1 & -0.21482 & -0.38059 \\ 1 & 2.12798 & 0 \end{bmatrix} \begin{bmatrix} Y \\ U \\ V \end{bmatrix}$$

In various embodiments, the video system 30 may communicate the resultant de-hazed RGB image on the display device 40 or save it to a memory or external storage device for later recall or further processing. Although the operation of FIG. 7 is described with respect to an RGB image, it will be understood that the disclosed operation can be applied to other color spaces as well.

Figure 8:
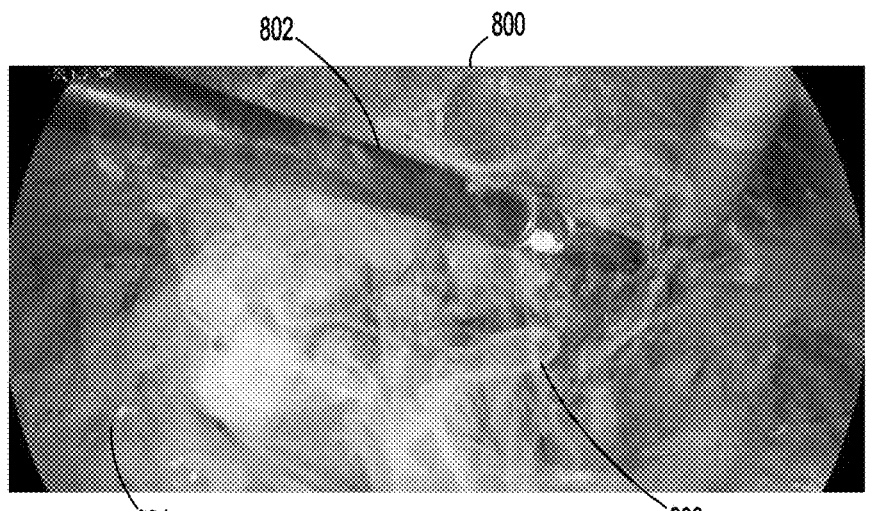
FIG. 8 is an exemplary image with smoke in accordance with the present disclosure.
Figure 9:
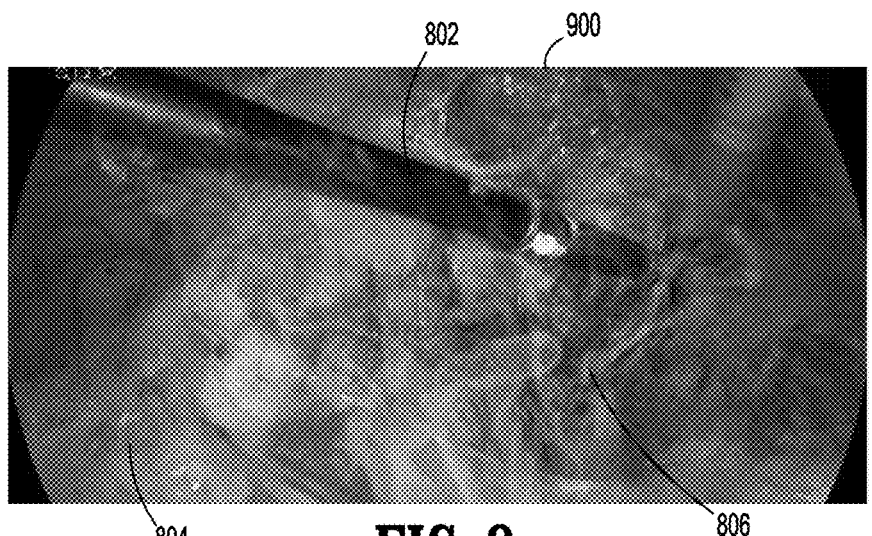
FIG. 9 is an exemplary de-hazed image with constant atmospheric light.
Figure 10:
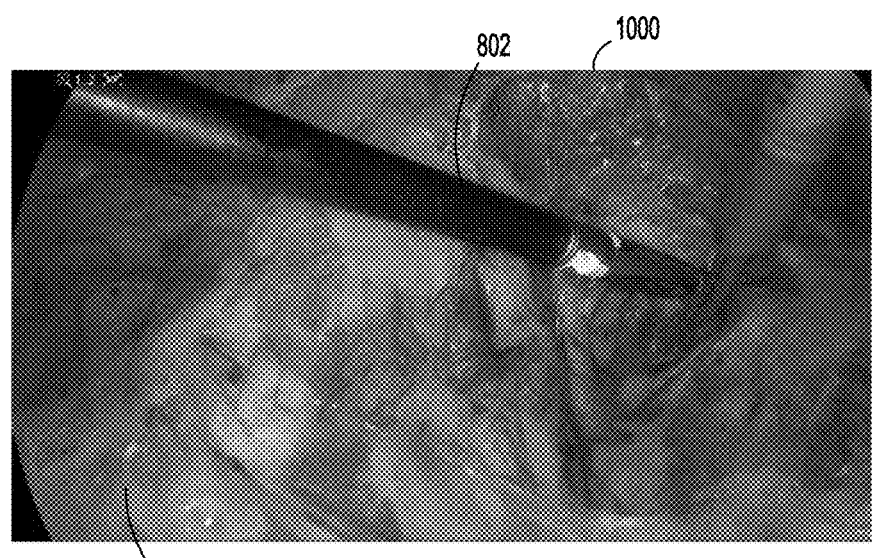
FIG. 10 is an exemplary de-hazed image with atmospheric light calculated in accordance with the present disclosure.

FIGS. 8-10 show an example result of the methods described in the previous sections. FIG. 8 shows an image 800 with smoke captured during a surgical procedure using the endoscope system 1. For example, during an endoscopic procedure, a surgeon may cut tissue 804 with an electrosurgical instrument 802. During this cutting smoke 806 may be generated. This smoke 806 would be captured in the image 800.

FIG. 9 shows a de-hazed image 900, where the image 800 from FIG. 8 was de-hazed was based on a constant atmospheric light value. The image 1000, still somewhat obscured by smoke 806, may include an electrosurgical instrument 802 and tissue 804. For example, in a case where a constant atmospheric light value A was used instead of the atmospheric light matrix A being estimated by the formula used in step 506.

FIG. 10 shows a de-hazed RGB image 1000, de-hazed using the method of FIGS. 5 and 7, as described herein. The de-hazed RGB image 1000 may include an electrosurgical instrument 802 and tissue 804. The method may start with the capture of the image 800 of FIG. 8 during a surgical procedure, as in step 502 using the endoscopic system 1. For example, the image may be approximately 20×20 pixels. Next, the video system 30 determines the dark channel matrix of the image as in step 504. For example, the size of the pixel area Ω(x) may be set to approximately 3×3 pixels.

The determined dark channel matrix of the image of FIG. 8 is used by the video system 30 to estimate the atmospheric light matrix by estimating a maximum value among the minimum color component intensities for each pixel in a pixel area, and multiplying this maximum value by a coefficient (e.g., 0.85) as in step 506. Next, as in step 508 the video system 30 calculates a transmission map (T) according to the dark channel matrix and the estimated atmospheric light matrix.

The transmission map (T) is used in a de-hazing operation as described in FIG. 7. At step 702 the video system 30 converts the RGB image I to a YUV image I-YUV. Next, at step 704 the video system 30 applies the de-hazing operation on channel Y (luma) of the I-YUV image by subtracting the estimated atmospheric light component A(x) from the Y (luma) channel and then dividing this difference by the determined transmission map, creating image I-Y'UV. Finally in step 706, the I-Y'UV image gets converted to a de-hazed RGB image 1000 (see FIG. 10).

The embodiments disclosed herein are examples of the present disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)." The term "clinician" may refer to a clinician or any medical professional, such as a doctor, nurse, technician, medical assistant, or the like, performing a medical procedure.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more machine-readable media or memory. The term "memory" may include a mechanism that provides (for example, stores and/or transmits) information in a form readable by a machine such as a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

It should be understood that the foregoing description is only illustrative of the present disclosure. Various alternatives and modifications can be devised by those skilled in the art without departing from the present disclosure. Accordingly, the present disclosure is intended to embrace all such alternatives, modifications and variances. The embodiments described with reference to the attached drawing figures are presented only to demonstrate certain examples of the present disclosure. Other elements, steps, methods, and techniques that are insubstantially different from those described above and/or in the appended claims are also intended to be within the scope of the present disclosure.

What is claimed is:

1. A method for smoke reduction in images comprising:
    accessing an RGB image of an object obscured by smoke, the RGB image including a plurality of pixels;
    determining a dark channel matrix of the RGB image, where the dark channel matrix includes, for each pixel of the plurality of pixels, a minimum color component intensity for a respective pixel area centered at the respective pixel;
    estimating an atmospheric light matrix for the RGB image based on the dark channel matrix, wherein the atmospheric light matrix includes an atmospheric light component value for each of the plurality of pixels;
    determining a transmission map based on the atmospheric light matrix and the dark channel matrix;
    de-hazing the RGB image based on the transmission map to reduce the smoke in the RGB image, wherein the de-hazing the RGB image includes:
        converting the RGB image to a YUV image;
        performing a de-hazing operation on the YUV image to provide a Y'UV image, wherein the performing the de-hazing operation on the YUV image includes, for each pixel x of the plurality of pixels:
            determining Y' as $$Y'(x) = \frac{Y(x) - A(x)}{T(x)},$$

wherein:
                T(x) is a transmission component for the pixel x, and
                A(x) is the atmospheric light component value for the pixel x; and
        converting the Y'UV image to the de-hazed RGB image; and
    displaying the de-hazed RGB image on a display device.

2. The method of claim 1, wherein the performing the de-hazing operation on the YUV image further includes replacing a Y channel of the YUV image with the determined Y' to provide a Y'UV image.

3. A method for smoke reduction in images comprising:
    accessing an RGB image of an object obscured by smoke, the RGB image including a plurality of pixels;
    determining a dark channel matrix of the RGB image, where the dark channel matrix includes, for each pixel of the plurality of pixels, a minimum color component intensity for a respective pixel area centered at the respective pixel;
    estimating an atmospheric light matrix for the RGB image based on the dark channel matrix, wherein the atmospheric light matrix includes an atmospheric light component value for each of the plurality of pixels, wherein the estimating the atmospheric light matrix includes, for each pixel x of the plurality of pixels:
        determining an atmospheric light component value for the pixel x as:

$$A(x) = \max(\min(I^c(y)))*\text{coef}, \text{ for all } y \in \Omega(x),$$

wherein:
                $\Omega(x)$ is a pixel area centered at pixel x,
                y is a pixel of the pixel area $\Omega(x)$,
                $I^c(y)$ is an intensity value of a color component c of the pixel y, and
                coef is a predetermined coefficient value;
    determining a transmission map based on the atmospheric light matrix and the dark channel matrix;
    de-hazing the RGB image based on the transmission map to reduce the smoke in the RGB image; and
    displaying the de-hazed RGB image on a display device.

4. A method for smoke reduction in images comprising:
    accessing an RGB image of an object obscured by smoke, the RGB image including a plurality of pixels;
    determining a dark channel matrix of the RGB image, where the dark channel matrix includes, for each pixel of the plurality of pixels, a minimum color component intensity for a respective pixel area centered at the respective pixel;
    estimating an atmospheric light matrix for the RGB image based on the dark channel matrix, wherein the atmospheric light matrix includes an atmospheric light component value for each of the plurality of pixels;
    determining a transmission map based on the atmospheric light matrix and the dark channel matrix, wherein the determining the transmission map includes determining, for each pixel x of the plurality of pixels, a transmission component value as:

$$T(x) = 1 - \omega * \frac{I\_DARK(X)}{A(X)},$$

wherein:
ω is a predetermined constant,
I_DARK(x) is the dark channel matrix value for the pixel x, and
A(x) is the atmospheric light component value for the pixel x;
de-hazing the RGB image based on the transmission map to reduce the smoke in the RGB image; and
displaying the de-hazed RGB image on a display device.

5. A method for smoke reduction in images comprising:
accessing an image obscured by smoke, the image including a plurality of pixels, where each pixel of the image includes a plurality of color components;
for each pixel of the plurality of pixels:
  determining a dark matrix channel value for the respective pixel as a minimum color component intensity value for a respective pixel area centered at the respective pixel; and
  estimating an atmospheric light component value for the pixel based on the minimum color component intensity value for each pixel of the pixel area;
de-hazing the image based on the atmospheric light component value for each of the plurality of pixels, wherein the de-hazing the image includes:
  determining a transmission map, for each pixel x of the plurality of pixels as:

$$T(x) = 1 - \omega * \frac{I\_DARK(X)}{A(X)},$$

wherein:
ω is a predetermined constant,
I_DARK(x) is the dark channel matrix value for the pixel x, and
A(x) is the atmospheric light component value for the pixel x,
converting the image to a YUV image;
determining Y', for each pixel x of the plurality of pixels as $$Y'(x) = \frac{Y(x) - A(x)}{T(x)};$$

and
  replacing a Y channel of the YUV image with the determined Y' to provide a Y'UV image; and
displaying the de-hazed image on a display device.

6. The method of claim 5, wherein the de-hazing the image further includes converting the Y'UV image to a de-hazed image.

7. The method of claim 6, wherein the image includes at least one of an RGB image, a CMYK image, a CIELAB image, or a CIEXYZ image.

8. A method for smoke reduction in images comprising:
accessing an image obscured by smoke, the image including a plurality of pixels, where each pixel of the image includes a plurality of color components;
for each pixel of the plurality of pixels:
  determining a dark matrix channel value for the respective pixel as a minimum color component intensity value for a respective pixel area centered at the respective pixel; and
  estimating an atmospheric light component value for the pixel based on the minimum color component intensity value for each pixel of the pixel area, wherein the estimating the atmospheric light component value includes, for each pixel x of the plurality of pixels:
    determining the atmospheric light component value for the pixel x as:

$A(x) = \max(\min(I^c(y)))*\text{coef}$, for all $y \in \Omega(x)$, wherein:
Ω(x) is a pixel area centered at pixel x,
y is a pixel of the pixel area Ω(x),
$I^c(y)$ is an intensity value of a color component c of the pixel y, and
coef is a predetermined coefficient value;
de-hazing the image based on the atmospheric light component value for each of the plurality of pixels; and
displaying the de-hazed image on a display device.

9. A system for smoke reduction in images comprising:
a light source configured to provide light;
an imaging device configured to acquire images;
an imagining device control unit configured to control the imaging device, the control unit comprising:
a processor; and
a memory storing instructions which, when executed by the processor, cause the system to:
  capture an image of an object obscured by smoke, by the imaging device, the image including a plurality of pixels, where each pixel of the image includes a plurality of color components;
  access the image;
  for each of the pixels:
    determine a dark channel matrix value for the respective pixel as a minimum color component intensity value for a respective pixel area centered at the respective pixel;
    estimate an atmospheric light component value for each pixel based on the minimum color component intensity value for each pixel of the pixel area; and
  de-haze the image based on the atmospheric light component value for each of the pixels, wherein the instructions when de-hazing the image, further cause the system to:
    determine a transmission map, for each pixel x of the plurality of pixels as:

$$T(x) = 1 - \omega * \frac{I\_DARK(X)}{A(X)},$$

wherein:
ω is a predetermined constant,
I_DARK(x) is the dark channel matrix value for the pixel x, and
A(x) is the atmospheric light component value for the pixel X,
convert the image to a YUV image;
determine Y' as $$Y'(x) = \frac{Y(x) - A(x)}{T(x)};$$

and
- replace a Y channel of the YUV image with the determined Y' to provide a Y'UV image; and
- display the de-hazed image on a display device.

10. The system of claim 9, wherein the instructions when de-hazing the image, further cause the system to convert the Y'UV image to a de-hazed image.

11. The system of claim 10, wherein the image includes at least one of an RGB image, a CMYK image, a CIELAB image, or a CIEXYZ image.

12. A system for smoke reduction in images comprising:
- a light source configured to provide light;
- an imaging device configured to acquire images;
- an imagining device control unit configured to control the imaging device, the control unit comprising:
  - a processor; and
  - a memory storing instructions which, when executed by the processor, cause the system to:
    - capture an image of an object obscured by smoke, by the imaging device, the image including a plurality of pixels, where each pixel of the image includes a plurality of color components;
    - access the image;
    - for each of the pixels:
      - determine a dark channel matrix value for the respective pixel as a minimum color component intensity value for a respective pixel area centered at the respective pixel; and
      - estimate an atmospheric light component value for each pixel based on the minimum color component intensity value for each pixel of the pixel area, wherein the instructions when estimating the atmospheric light component of the image, further cause the system to:
        - determine the atmospheric light component value for the pixel x as:

$$A(x) = \max(\min(I^c(y)))^*\text{coef},$$

wherein:
- y is a pixel,
- $I^c$ is a color component of the pixel y, and
- coef is a predetermined coefficient; and
- de-haze the image based on the atmospheric light component value for each of the pixels; and
- display the de-hazed image on a display device.

* * * * *